Feb. 1, 1955 E. M. PAYNE ET AL 2,701,141
SOUND RECORDING AND REPRODUCING APPARATUS
Filed Feb. 20, 1950
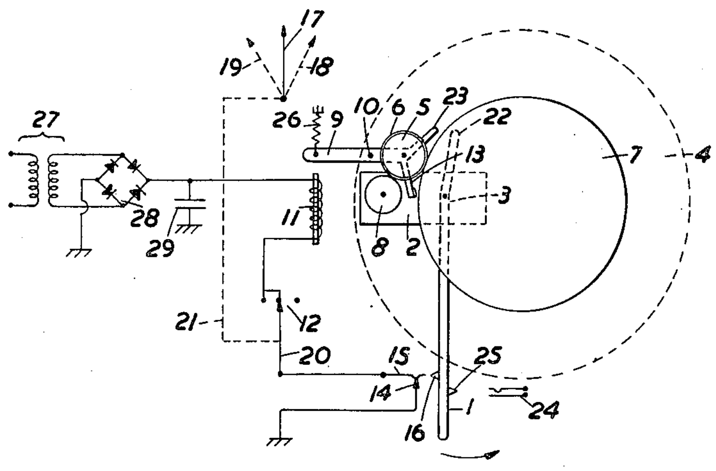
Inventors
EDWIN MALCOLM PAYNE
HENRY MILBURN HARRISON
By Ralph E. Atherton
Attorney United States Patent Office 2,701,141

Patented Feb. 1, 1955

2,701,141

SOUND RECORDING AND REPRODUCING APPARATUS

Edwin Malcolm Payne, Hillingdon, and Henry Milburn Harrison, Hanworth, England, assignors to Electric & Musical Industries Limited, Hayes, England, a British company Application February 20, 1950, Serial No. 145,176

Claims priority, application Great Britain February 23, 1949

6 Claims. (Cl. 274—9)

This invention relates to sound recording and reproducing apparatus.

It has been proposed to provide sound recording and reproducing apparatus in which the sound is magnetically recorded on a disc of paper or the like coated with magnetic material. One form of said apparatus is described in the specification of co-pending patent application Serial No. 130,274, filed November 30, 1949, by E. M. Payne and H. M. Harrison and comprises a turntable for supporting the disc and a tracking disc which can be placed on the turntable on top of the record disc so as to be in driving connection with the turntable and a transducing head which, by engagement with the tracking disc when the turntable rotates, is caused to track radially with respect to the record disc on the turntable. Apparatus of this kind is particularly useful for commercial purposes for recording speech so that the speech can be subsequently typed on reproduction thereof.

In one form of apparatus, the same mechanism can be employed both for recording and for reproduction purposes, the apparatus being provided with a suitably arranged switch so that the apparatus can be set either for recording or for reproduction. The speed of rotation of the turntable for recording purposes is fairly critical, but it is sometimes desirable for the record to be reproduced at a speed different from the recording speed. For example, in typing from fast dictation it may be desirable to reproduce at a speed lower than the recording speed, or in the case of a disc recorded on a first apparatus having a relatively high recording speed, and to be reproduced on a second apparatus having a lower recording speed, it may be desirable to reproduce at a higher speed than the recording speed of said second apparatus. Accordingly, it is desirable to provide a speed control for the motor driving the apparatus, but this introduces a difficulty since when the apparatus is re-set for recording, the recording will be impaired unless the speed control is re-adjusted to the proper recording speed.

The invention also relates to apparatus of the types wherein the sound is recorded on and reproduced from magnetic wire, or tape coated with magnetic material. It will be appreciated that the above remarks apply equally to apparatus of these last-mentioned types.

The object of the present invention is to provide an improved sound recording and reproducing apparatus having a speed control for the motor thereof in which the above-mentioned difficulty is overcome.

According to the present invention there is provided sound recording and reproducing apparatus having a driving motor provided with a speed control member and means whereby if said speed control member is set for a speed different from the appropriate recording speed, recording cannot be effected until the speed control member is re-set to the appropriate recording speed.

In order that the said invention may be clearly understood and readily carried into effect, it will now be more fully described with reference to the accompanying drawing the single figure of which is a plan view of one embodiment of the invention as applied by way of example to said recording and reproducing apparatus in which sound is recorded on discs.

As shown the apparatus comprises a speed control member formed by a lever 1 arranged to control the speed of an electric motor 2 in any suitable way, for example, by operating on a centrifugal governor (not shown) associated with the motor 2. The lever 1 is mounted on the upper side of motor 2 on a pivot 3 and is arranged to be angularly adjustable from the position in which the speed of the motor 2 is that desired for recording purposes and when the lever 1 is moved away from this position (in the direction of the arrow) the speed of the motor 2 is reduced. For example, the desired speed of recording may be 15 revolutions per minute of the turntable. The turntable, which is indicated by the dotted circle 4, may be driven by means of a driving disc 5 having a peripheral rubber ring 6 engaging a pulley 7 on the under side of the turntable 4, said disc 5 in turn being driven by a pulley 8 coupled to the motor 2. Said driving disc 5 is carried on an arm 9 which is mounted for angular movement about a pivot 10, in such a way that the disc 5 in one position of arm 9 is in engagement with said pulleys 7 and 8 and in another position is out of engagement therewith in which latter position the turntable 4 is not driven. Said arm 9 is associated with a solenoid 11 which is coupled in circuit with a suitable switch 12 whereby the solenoid 11 is energised at appropriate times to cause movement of arm 9 and thus to control the driving of the turntable 4. The solenoid 11 also serves to actuate a brake of any suitable form, comprising for example an arm 13 projecting from arm 9, as shown, so that when the solenoid is energised not only is said driving disc 5 moved out of engagement with the pulley 7 on the turntable, but said brake 13 is also applied. Said brake may be arranged to operate against the pulley 7. In circuit with the solenoid 11 is a further switch 14 comprising a pair of contacts one of which is mounted on a spring arm 15 which is adapted to be engaged by a projection 16 on the speed control lever 1 only when the latter is set in a position corresponding to the desired recording speed. A main control is provided comprising a knob or arm 17 which can be moved to various positions; in one position indicated by dotted line 18 the apparatus is set for reproduction and in the position of arm 17, shown and in the position indicated by dotted line 19, the apparatus is set for recording. The position shown may for example serve to condition the apparatus for recording by means of a microphone incorporated in the apparatus, position 19 conditioning the apparatus to enable recording to be made from an auxiliary microphone. The arm 17 is coupled to a switch contact arm 20 as indicated by the dotted line 21 and in either recording position a circuit is completed through the solenoid 11 and through the switch 12 associated with the speed control lever 1, so as to energise solenoid 11 if the speed control lever 1 is in any position other than that corresponding to the desired recording speed. When the arm 17 is set for reproduction the solenoid 11 is switched out of circuit, due to the circuit of the solenoid being interrupted at switch 12.

It will be appreciated that if, after the apparatus has been used for reproduction, the speed control lever 1 is set for a speed lower than the desired recording speed, then when the arm 17 is adjusted to set the apparatus for recording a circuit will be closed through solenoid 11 so that the solenoid will apply brake 13 and will also move disc 5 out of driving engagement with the turntable 4. Consequently, the apparatus cannot be operated for recording until the speed control lever 1 is moved to a position corresponding to the desired recording speed and when moved to such position (to the left of that shown) the projection 16 will engage said spring arm 15 so as to open the circuit to the solenoid 11 whereby the latter is de-energised and the brake 13 is released and the disc 5 is moved into driving engagement with the turntable 4 under the action of a spring 26 connected between arm 9 and a suitable part of the apparatus.

If desired, the speed control lever 1 may be arranged to operate the main on/off switch 24 controlling the supply of current to the motor 2, this switch being opened by a projection 25 when the lever 1 is moved to its extreme position remote from the position corresponding to the desired recording speed. In such extreme position an extension 22 of the speed control lever 1 may be arranged to engage an arm 23 projecting from the arm 9 carrying driving disc 5 so that the disc 5 is moved out of engagement with the turntable 4 so as to avoid the formation of flats on the rubber ring 6 of said disc 5 when the apparatus is not in use.

Any suitable source of current may be employed for energising solenoid 11. In the arrangeemnt shown direct current is derived for this purpose from A. C. mains via a transformer 27, rectifier 28 and smoothing condenser 29.

If desired, the arrangement described may be modified so that lever 1 can be moved to the left of the position in which switch 14 is opened, so as to enable the turntable to rotate at a higher speed during reproduction than the recording speed the contacts of switch 14 opening and closing again as projection 16 passes between them.

What we claim is:

1. In sound recording and reproducing apparatus in which a sound record can be driven by a driving mechanism at different speeds, an adjustable member for adjusting the speed of said driving mechanism, means for conditioning the apparatus for recording or reproduction, a motor, a driving member for driving said sound record, coupling means between said motor and said member, means for moving said coupling means into and out of coupling engagement with said motor and said driving member, and means intercoupling said conditioning means, said adjusting member and said means for moving said coupling means, whereby said coupling means is out of coupling engagement unless said adjustable member is in a predetermined position.

2. In sound recording and reproducing apparatus in which a sound record can be driven by a driving mechanism at different speeds, an adjustable member for adjusting the speed of said driving mechanism, means for conditioning the apparatus for recording or reproduction, a motor, a driving member for driving said sound record, coupling means between said motor and said member, a solenoid for moving said coupling means into and out of coupling engagement with said motor and said driving member, an electric circuit including said solenoid, a switch in said electric circuit coupled to said conditioning means, and a further switch in said electric circuit for operation when said adjusting member is in a predetermined position to allow said coupling means to effect coupling engagement.

3. Sound recording or reproducing apparatus according to claim 2, said coupling means comprising a driving disc, a movable arm carrying said driving disc, a pulley driven by said motor, and a further pulley for driving said sound record, said arm being responsive to said solenoid to engage and disengage said driving disc with said pulleys.

4. In sound recording and reproducing apparatus according to claim 3, said arm being provided with a brake disposed to engage said pulley driving said sound record in response to movement of said arm to disengage said driving disc from said pulleys.

5. In sound recording and reproducing apparatus, means for conditioning said apparatus for recording or reproduction, driving mechanism capable of driving a sound record at different speeds, an adjustable member for adjusting the speed of said driving mechanism thereby to enable the reproducing speed to be reduced compared with the recording speed and means coupling said conditioning means with said driving mechanism whereby said adjustable member is operative to reduce the speed of said driving mechanism only when said apparatus is conditioned for reproduction, said coupling means including means effective to prevent operation of said driving mechanism when said apparatus is conditioned for recording unless said adjusting member is in a predetermined position corresponding to a speed appropriate for recording.

6. In sound recording and reproducing apparatus, means for conditioning said apparatus for recording or reproduction, a single driving motor, means for transferring the drive from said motor to a sound record, an adjustable member for adjusting the speed of said sound record thereby to enable the reproducing speed to be reduced compared with the recording speed, and means coupling said conditioning means with said first-mentioned means whereby said adjusting member is operative to reduce the speed of said sound record only when said apparatus is conditioned for reproduction, said coupling means including means effective to prevent said driving motor driving said sound record when said apparatus is conditioned for recording unless said adjusting member is in a predetermined position corresponding to a speed appropriate for recording.

References Cited in the file of this patent

UNITED STATES PATENTS

| | | |
|---|---|---|
| 1,715,873 | Stockton | June 4, 1929 |
| 2,196,434 | Allstrom | Apr. 9, 1940 |
| 2,241,483 | Schneider | May 13, 1941 |
| 2,440,420 | Van Eps | Apr. 27, 1948 |
| 2,526,188 | Andres | Oct. 17, 1950 |
| 2,529,019 | Hardy | Nov. 7, 1950 |
| 2,536,666 | Somers | Jan. 2, 1951 |
| 2,577,876 | Cranmer | Dec. 11, 1951 |